United States Patent [19]

Koukal et al.

[11] Patent Number: 4,795,090
[45] Date of Patent: Jan. 3, 1989

[54] AIR-CONDITIONING INSTALLATION FOR VEHICLES

[75] Inventors: Heinz Koukal; Klaus Arold, both of Sindelfingen; Hermann Grimm, deceased, late of Ostelsheim, all of Fed. Rep. of Germany, by Christel Grimm, heir

[73] Assignee: Daimler-Benz Aktiengesellschaft, Stuttgart, Fed. Rep. of Germany

[21] Appl. No.: 933,937

[22] Filed: Nov. 24, 1986

[30] Foreign Application Priority Data

Nov. 22, 1985 [DE] Fed. Rep. of Germany ....... 3541263

[51] Int. Cl.$^4$ ................................................ F24F 7/06
[52] U.S. Cl. .............................. 236/49; 236/DIG. 19; 374/135
[58] Field of Search .......................... 236/49, DIG. 19; 417/83; 62/500; 374/135

[56] References Cited

U.S. PATENT DOCUMENTS

| | | | |
|---|---|---|---|
| 874,986 | 12/1907 | Parsons | 62/500 X |
| 1,760,082 | 5/1930 | Parks | 236/DIG. 19 |
| 2,104,847 | 1/1938 | Brace et al. | 62/500 X |
| 2,123,021 | 7/1938 | Phillips | 62/500 X |
| 2,200,138 | 5/1940 | Von Sauer | 62/500 X |
| 3,228,381 | 1/1966 | Stefan | 417/83 X |
| 3,738,572 | 6/1972 | Hall, Jr. | 236/DIG. 19 |
| 3,743,180 | 7/1973 | Perkins et al. | 236/DIG. 19 |
| 4,141,496 | 2/1979 | Duchek | 236/DIG. 19 |
| 4,445,637 | 5/1984 | Hedrick | 236/49 |
| 4,623,090 | 11/1986 | Heger | 236/DIG. 19 |

FOREIGN PATENT DOCUMENTS 3045893 7/1982 Fed. Rep. of Germany .
3519466 12/1985 Fed. Rep. of Germany .

Primary Examiner—William E. Tapolcai
Attorney, Agent, or Firm—Barnes & Thornburg

[57] ABSTRACT

In an air-conditioning installation for vehicles with a blower for supplying fresh air to a vehicle interior space, with a temperature sensor for detecting the interior space temperature and with an air jet pump, consisting of a venturi pipe and of an air suction connection for producing an air flow over the temperature sensor, the air jet pump is arranged integrated in the blower for reducing the individual components for the temperature detection and for reducing the requisite installation space in the vehicle in such a manner that its air outlet opening lies within the blower stream. The temperature sensor is thereby so arranged that it is acted upon by the interior space air sucked-in by way of the air suction connection.

9 Claims, 2 Drawing Sheets

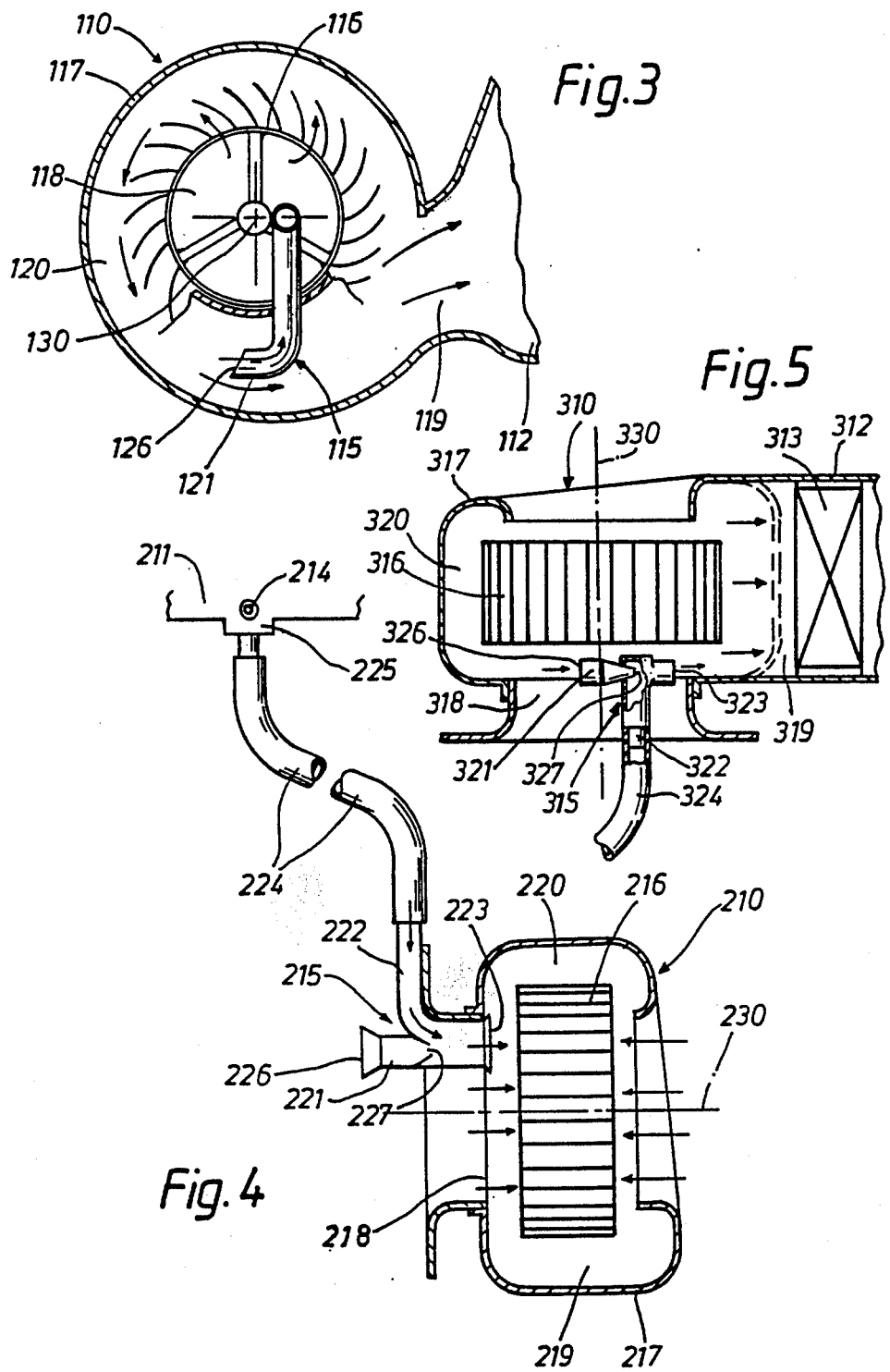

AIR-CONDITIONING INSTALLATION FOR VEHICLES

The present invention relates to an air-conditioning installation for vehicles, especially for motor vehicles, with a blower for supplying fresh air to the vehicle interior space, with a temperature sensor for detecting the interior space temperature and with an air jet pump for producing an air flow over the temperature sensor which includes a venturi pipe acted upon by the flow from the blower and an air suction connection coordinated thereto and operatively connected with the interior space.

The term "air-conditioning installation" is to be understood herein as to include such a system in the vehicle, by means of which the temperature in the interior space of a vehicle can be adjusted to a preselected interior space temperature and can be kept constant within limits. It may thereby involve a pure heating installation in which the interior space is heated to a predetermined temperature, as also a combined heating/air-conditioning installation in which the interior space of the vehicle can be cooled off at high outside temperatures to an interior temperature lying below the outside temperature.

In a known air-conditioning installation of this type (DE-OS No. 30 45 893), the automatic regulation of the interior space temperature of a vehicle is effected in that the air jet pump arranged outside of the air distributor housing within a by-pass protrudes through the blower housing into the blower air stream with the air inlet opening of its venturi pipe on the pressure side of the blower. A small amount of the blower air thus flows through the venturi pipe and produces at the air outlet opening thereof a vacuum which sucks in air out of the interior space by way of the air suction connection. This interior space air is conducted together with the blower fresh air leaving the venturi pipe to a heat sensor of a regulating device. Depending on the temperature of the interior space air and of the fresh air, a corresponding mixed temperature results for the mixed air acting upon the heat sensor. Depending on the temperature of the mixed air, the heat sensor opens up more or less the opening cross section determined by a desired value transmitter of a nozzle. The vacuum produced by the nozzle controls an adjusting motor for control flaps or valves in the air distributor housing.

With such an air jet pump for sensing the interior space temperature, a relatively large number of parts are required which is disadvantageous in particular as regards the assembly costs. The by-pass necessary for the air jet pump requires additional constructional space.

The present invention is concerned with the task to improve an air-conditioning installation of the aforementioned type as regards a reduction of the individual components for the interior space temperature sensing and as regards a reduction of the installation volume.

The underlying problems are solved according to the present invention with an air-conditioning installation of the type described above in that the air jet pump is integrated into the blower in such a manner that its air outlet opening lies in the air flow of the blower, and in that the temperature sensor is so arranged that it is acted upon by the interior space air sucked-in by way of the air suction connection.

The air conditioning installation according to the present invention offers the advantage that by integrating the air jet pump in the blower, structural space which is present anyhow, is utilized and therewith no additional installation space is required for the air jet pump. By the integration in accordance with the present invention parts of the air jet pump can also be manufactured in one piece with the blower housing so that the number o the necessary individual components is considerably reduced and therewith the assembly expenditures are lowered. The interior space temperature is reliably detected by the arrangement of the temperature sensor within the area of the suction connection and the arrangement of the air outlet opening of the air jet pump in the blower air flow; for a suction results from the blower stream at the outlet of the air jet pump which keeps the flow velocity of the interior space air sucked-in over the temperature sensor nearly constant and independent of the vehicle velocity. The air scooped off by the air jet pump from the interior space and from the blower stream is again conducted to the blower stream still within the blower and thus is subjected to the climatic preparation by the evaporator and the heat-exchanger.

These and other objects, features and advantages of the present invention will become more apparent from the following description when taken in connection with the accompanying drawing which shows, for purposes of illustration only, several embodiments in accordance with the present invention, and wherein:

FIG. 3 is a cross-sectional view of the blower housing in the direction of arrow III of FIG. 2;

FIG. 4 is a longitudinal cross-sectional view through a blower of an air-conditioning installation according to a third embodiment of the present invention; and FIG. 5 is a longitudinal cross-sectional view of a blower and air distributor box, the latter only in part of an air-conditioning installation according to a fourth embodiment of the present invention.

Figure 1:
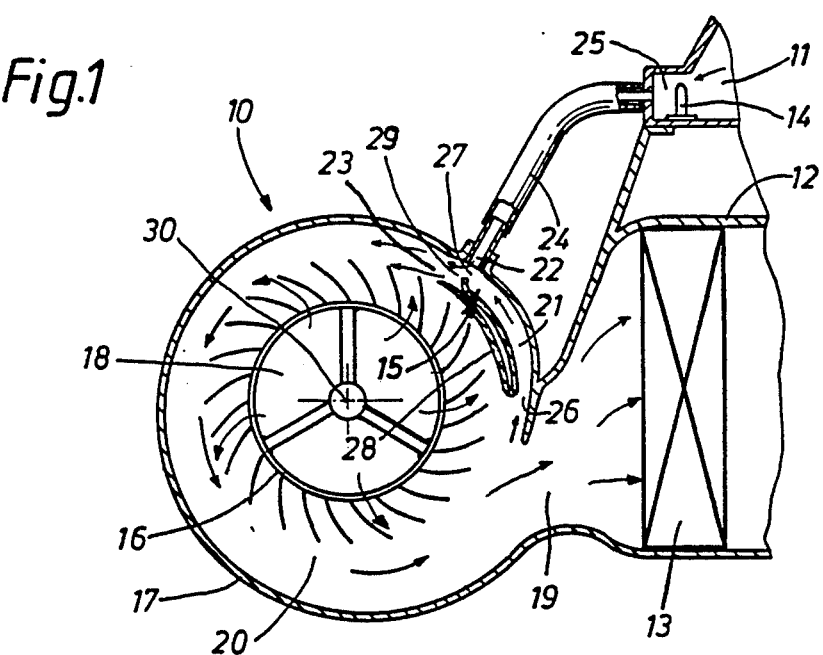
FIG. 1 is a cross-sectional view through the blower and the air-distributor box, the latter only in part, of an air-conditioning installation according to a first embodiment of the present invention.

Referring now to the drawing wherein like reference numerals are used throughout the various views to designate corresponding parts, and more particularly to FIG. 1, an air-conditioning installation for a motor vehicle includes a blower generally designated by reference numeral 10 for supplying fresh air into an interior space of a motor vehicle indicated by reference numeral 11. In the same figure, an air distributor box 12 is shown in part, in which a heat-exchanger 13 is provided for heating the fresh air supplied by the blower 10. For the control of the temperature of the interior space 11, a temperature sensor 14 for detecting the existing space temperature is provided. For that purpose, an air stream of the interior space air which is as constant as possible is thereby guided over the temperature sensor 14. This air stream of the interior space air is produced by means of an air jet Pump generally designated by reference numeral 15 which is integrated in the blower 10.

As can be seen from the flow arrows indicated in FIG. 1, the blower 10 is constructed as so-called axial fan and includes a cylindrical rotor 16 which is surrounded with a radial spacing by a cylindrical housing 17 so that a circular air flow channel 20 is formed between the rotor 16 and the housing 17. The housing 17 has an air inlet opening 18 which extends transversely to the axis 30 of the rotor 16, respectively, of the housing 17 and hereinafter will be referred to as axial air inlet opening 18, and a tangential air outlet opening 19 whose axis extends approximately tangentially to the housing 17. The air distributor box 12 adjoins the tangential air outlet opening 19. In all embodiments illustrated in the drawing, the blower is constructed as such an axial fan.

The air jet pump 15 includes adventure pipe 21 which is acted upon by the air stream produced by the blower, to be referred to hereinafter as blower stream, and an air suction connection 22 coordinated to the venturi pipe 21 which is in communication with the interior space 11 of the vehicle. The construction and operation of such an air jet pump are known so that a detailed description thereof is dispensed with herein for the sake of simplicity. The air jet pump is constructed in the same manner in the further embodiments to be described hereinafter of the air-conditioning installation according to the present invention.

The air jet pump 15 which can be seen in FIG. 1, is integrated in the blower 10, as also in all further embodiments of this invention, in such a manner that its air outlet opening 23 lies within the blower stream. As in FIG. 1, the temperature sensor 14 is arranged also in all further embodiments of the present invention in such a manner that it is acted upon by the interior space air which is sucked-off out of the interior space 11 by the air jet pump 15 by way of the air suction connection 22. For that purpose, the air suction connection 22 is connected by way of a hose 24 with a suction nozzle 25 terminating in the interior space 11, in the air inlet area of which is arranged the temperature sensor 14.

In the air-conditioning installation according to FIG. 1, the venturi pipe 21 is arranged—as viewed in the flow direction—in the forward area of the circular air flow channel 20 formed between the housing 17 and the rotor 16 directly at the inner wall of the housing 17 in such a manner that it extends in the longitudinal direction of the air guide channel 20 and is located with its air inlet opening 26 near the tangential air discharge opening 19 in the housing 10 and points in the direction toward the same. The air suction connection 22 is extended approximately radially through the housing 17 of the blower 10 and terminates directly at the constricted air outflow opening 27 of the venturi pipe 21. A correspondingly formed hosing web 28 forms together with the inner wall of the housing 17 a flow channel 29 disposed ahead of the air outlet opening 27 of the venturi pipe 21 and of the discharge orifice of the air suction connection 22; the discharge orifice of the flow channel 29 forms the air outlet opening 23 of the air jet pump 15.

With the inclusion of the air jet pump 15 in the blower housing 17 as described hereinabove, a small portion of the fresh air sucked-in by way of the air inlet opening 18 is forced through the venturi pipe 21 of the air jet pump 15. Additionally, owing to the rotating rotor 16 a suction results at the air outlet opening 23 of the air jet pump 15 which assists the air during the through-flow of the venturi pipe 21, respectively, of the air jet pump 15. The vacuum which results at the discharge orifice of the air suction connection 22 and the vacuum which results at the air outlet opening 23 of the air jet pump 15 sucks-in interior space air by way of the air suction connection 22, which thus flows over the temperature sensor 14. The fresh air scooped off from the blower stream and the interior space air sucked out of the interior space 11 are again conducted into the blower stream at the air outlet opening 23 of the air jet pump 15, which together with the further blower air then flows into the air distributor box 12.

Figure 2:
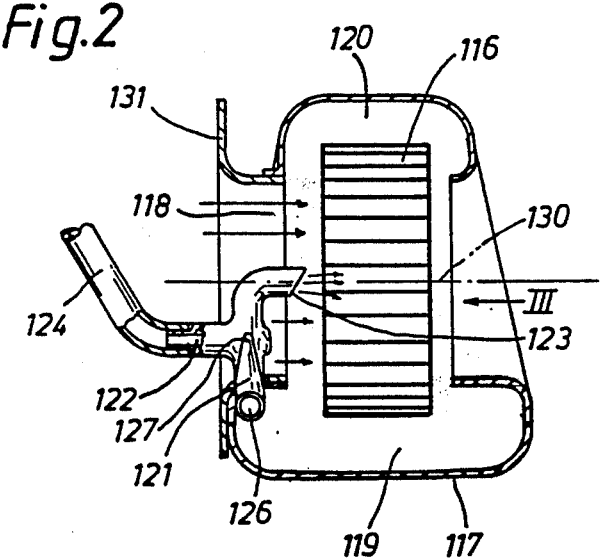
FIG. 2 is a longitudinal cross-sectional view of a blower of an air-conditioning installation according to a second embodiment of the present invention.

The air-conditioning installation illustrated in part in FIGS. 2 and 3, far-reachingly corresponds with the air-conditioning installation described in connection with FIG. 1 so that the same parts are designated with the reference numerals increased by 100. The difference of the embodiment in FIGS. 2 and 3 resides in the arrangement of the air jet pump 115 in the blower 110. The air jet pump 115 is arranged in this case in the axial air inlet opening 118 of the blower housing 117 in such a manner that the axes of its air outlet opening 123 and of its air suction connection 122 extend approximately parallel to the blower axis which is coincident with the axis 130 of the rotor 116. The air suction connection 122 is again connected with the vehicle interior space (not shown) by way of a hose 124 adapted to be mounted over the air suction connection 122. The venturi pipe 121 is so shaped that it protrudes with its air inflow opening 126 into the circular air flow channel 120 formed between the housing 117 and the rotor 116, whereby the air inlet opening 126 is arranged transversely to the longitudinal direction of the air flow channel 120, opposite the blower stream. The air inlet opening 126 of the venturi pipe 121 is thereby located in the outlet area of the air flow channel 120, near the tangential air discharge opening 119 of the housing 117. The air jet pump 115 is secured at an annular insert 131 which is retained at the housing 117 of the blower in the air inlet opening 118 thereof.

With this inclusion of the air jet pump 115 in the blower 110, the air inlet opening 126 of the venturi pipe 121 projects opposite the flow direction of the fresh air sucked-in by the blower 110 and is traversed by a small portion thereof. The air outlet opening 123 of the air jet pump 115 still lies within the suction area of the blower 110 and more particularly in the air flow direction, and thus is subjected constantly to the suction action of the blower rotor 116 (with a turned-off blower 110, the suction action is smaller owing to the now-only-present ram pressure). As to the rest, the operation of the air jet pump is identical with that in FIG. 1 as regards the sensing of the air temperature in the motor vehicle interior space.

The third embodiment of an air-conditioning installation which is illustrated in part in longitudinal cross section in FIG. 4, again corresponds with the two previously described embodiments except for the arrangement of the air jet pump 215 so that the same components are designated by the same reference numerals, however, increased by 200. The air jet pump 215 is in this case—as in the embodiment in FIGS. 2 and 3—arranged in the axial air inlet opening 218 of the blower housing 217 in such a manner that the axes of its air outlet opening 223 and of its venturi pipe 221 extend parallel to the blower axis, respectively, the axis of the rotor 216. The air suction connection 222 of the air jet pump 215 protrudes radially away from the venturi pipe 221 and more particularly directly ahead of the air inlet opening 218. It is again connected with the motor vehicle interior space 211 by way of a hose 224 adapted to be mounted over the suction connection whereby the hose 224 is mounted in that embodiment on a suction nozzle 225, in the suction area of which is located the temperature sensor 214. Also in this embodiment, the air inlet opening 226 of the venturi pipe 221 and the air discharge opening 223 of the air jet pump 215 are disposed in the suction area of the blower 210. With the described assembly, a part of the fresh air is sucked-in exclusively by the air jet pump 215. A suction action by the rotor 216 exists only within the area of the air inlet opening 223. The air jet pump 215 is completely integrated in the blower housing 117.

The air-conditioning installation partly illustrated in cross section i FIG. 5 again far-reachingly corresponds with the embodiments described hereinabove so that the same reference numerals are used, increased by 300. In contrast to the embodiment in FIG. 4, the similarly constructed air jet pump 315 is mounted on the pressure side of the blower 310. The air jet pump 315 is thereby arranged in the tangential air discharge opening 319 of the blower housing 317 in such a manner that the axes of its air discharge opening 323 and of its venturi pipe 321 extend approximately parallel to the axis of the tangential air discharge opening 319, i.e., transversely to the axis 330 of the rotor 316. Also in this case, the air suction connection 322 extends at right angle to the venturi pipe 321 and is extended out of the housing 317 parallel to the axis 330 of the rotor 316. A hose 324 mounted over the suction connection 32 again connects the air jet pump 315 with the interior space of the motor vehicle.

In this embodiment, the air jet pump 315 is again completely integrated into the blower housing 317.

The fresh air which is sucked-in by the blower 310 and is forced through the air outlet opening 319, is forced in small part through the air jet pump 315. An additional suction action of the rotor 316 on the air jet pump 315 as, for example, in FIG. 1, does not exist in this embodiment.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

It is claimed:

1. An air-conditioning installation for vehicles, comprising blower means having a blower housing for producing a blower stream for supplying fresh air to a vehicle interior space, temperature sensor means for detecting the interior space temperature, air jet pump means for producing an air stream over the temperature sensor means including venturi pipe means acted upon by the blower stream and air suction connection means coordinated to the venturi pipe means and operatively connected with the interior space, the air jet pump means being mounted at least partly in the blower housing in such a manner that its air outlet opening lies within the blower stream, and the temperature sensor means being so arranged that it is acted upon by the interior-space-air sucked in by way of the air suction connection means.

2. An air-conditioning installation according to claim 1, in which the blower means is constructed as axial blower having a cylindrical housing means surrounding a rotor with a radial spacing, an air inlet opening substantially coaxial to the rotor and an air discharge opening substantially tangential to the rotor, the venturi pipe means being arranged—as viewed in the flow direction—in the forward area of a circular air flow channel formed between the housing means and the rotor substantially directly at the inner wall of the housing means in such a manner that it extends in the longitudinal direction of the air flow channel and points with its air inlet opening toward the tangential air discharge opening of the housing means, and the air suction connection means extending approximately radially through the housing means.

3. An air-conditioning installation according to claim 1, in which the blower means is constructed as axial blower having a cylindrical housing means surrounding a rotor with a radial spacing, an air inlet opening substantially coaxial to the rotor and an air discharge opening substantial tangential to the rotor, the air jet pump means being arranged in the axial air inlet opening of the housing means in such a manner that the axes of its air outlet opening and of its air suction connection means extend approximately parallel to the blower axis, that the air suction connection means is operatively connected with the vehicle interior space by way of a hose and that the venturi pipe means is so formed that it protrudes with its air inlet opening into a circular air flow channel formed between the housing means and the rotor and that its air inlet opening extends substantially transversely to the longitudinal direction of the air flow channel.

4. An air-conditioning installation according to claim 3, wherein the air inlet opening of the venturi pipe means is located within the outlet area of the air flow channel near the tangential air discharge opening of the housing means.

5. An air-conditioning installation according to claim 4, wherein the air jet pump means is secured at an annular insert which is retained at the blower housing means in the air inlet opening.

6. An air-conditioning installation according to claim 1, in which the blower means is constructed as axial blower having a cylindrical housing means surrounding a rotor with radial spacing, an air inlet opening substantially coaxial to the rotor and an air discharge opening substantially tangential to the rotor, the air jet pump means being arranged in the axial air inlet opening of the housing means in such a manner that the axes of its air outlet opening and of its venturi pipe means extend approximately parallel to the blower axis and that the air suction connection means of the air jet pump means extends approximately radially thereto.

7. An air-conditioning installation according to claim 6, wherein the air suction connection means of the air jet pump means extends approximately radially to the blower axis directly ahead of the air inlet opening.

8. An air-conditioning installation according to claim 1, in which the blower means is constructed as axial blower having a cylindrical housing means surrounding a rotor with radial spacing, an air inlet opening substantially coaxial to the rotor and an air discharge opening substantially tangential to the rotor, the air jet pump means being arranged in the tangential air discharge opening of the blower housing means in such a manner that the axes of its air outlet opening and of its venturi pipe means extend approximately parallel to the axis of the tangential air discharge opening of the housing means and that the air suction connection means of the air jet pump means is extended out of the housing means approximately at right angle thereto.

9. An air-conditioning installation according to claim 3, wherein the air jet pump means is secured at an annular insert which is retained at the blower housing means in the air inlet opening.

* * * * *